(12) United States Patent
Kreuk

(10) Patent No.: US 7,660,265 B2
(45) Date of Patent: Feb. 9, 2010

(54) NETWORK PACKET INSPECTION AND FORWARDING

(75) Inventor: Volkert N M Kreuk, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 11/553,495

(22) Filed: Oct. 27, 2006

(65) Prior Publication Data

US 2008/0148386 A1 Jun. 19, 2008

(51) Int. Cl.
*H04L 12/28* (2006.01)

(52) U.S. Cl. .................................................... 370/254

(58) Field of Classification Search ................. 370/401, 370/254, 392
See application file for complete search history.

(56) References Cited

U.S. PATENT DOCUMENTS

| | | | |
|---|---|---|---|
| 7,072,346 B2 | 7/2006 | Hama | |
| 7,075,933 B2 | 7/2006 | Aysan | |
| 2002/0037010 A1 | 3/2002 | Yamauchi | |
| 2003/0016672 A1* | 1/2003 | Rosen et al. ................. | 370/392 |
| 2005/0025069 A1* | 2/2005 | Aysan ......................... | 370/254 |
| 2006/0074618 A1* | 4/2006 | Miller et al. .................. | 703/13 |
| 2006/0174336 A1* | 8/2006 | Chen ........................... | 726/11 |

OTHER PUBLICATIONS

Network Virtualization for the Campus; Copyright 2006 Cisco Systems, Inc. 17 pages.
Cisco IPSEC and SSL VPN Solutions; Copyright 1992-2004 Cicso Systems, Inc. 15 pages.

* cited by examiner

*Primary Examiner*—Ayaz R Sheikh
*Assistant Examiner*—Hai-Chang Hsiung
(74) *Attorney, Agent, or Firm*—Schmeiser, Olsen & Watts; William E. Schiesser

(57) ABSTRACT

A network, method, and a method of providing a service for packet inspection and forwarding using multi-protocol label switching for a virtual private network in a public network. The network includes a first router, the first router being a provider edge multi-protocol label switching capable router, the first router including a firewall service module for inspection of packets, the firewall service module connected to one or more virtual private networks; one or more second routers, each second router of the one or more second routers being provider edge multi-protocol label switching capable routers, each second router connected to a private virtual network of the one or more virtual private networks; and a network connecting the first router to the one or more second routers.

29 Claims, 6 Drawing Sheets

NETWORK PACKET INSPECTION AND FORWARDING

RELATED APPLICATIONS

The present application is related to pending application, Ser. No. 11/553,510.

FIELD OF THE INVENTION

The present invention relates to the field of routing; more specifically, it relates to a method, network and service to provide packet inspection and forwarding in a public network offering virtual private network services using multi-protocol label switching.

BACKGROUND OF THE INVENTION

Traditional solutions allowing packet inspection and forwarding between multi-protocol label switching/virtual private networks in a public network for virtual private networks necessitates the use of an external firewall device with one or more physical links to each of the interconnected multi-protocol label switched/virtual private networks. Drawbacks of this solution are the cost of the external equipment and less than optimal packet inspection and forwarding and capacity constrained by the physical links and not the firewall. Accordingly, there exists a need in the art to overcome the deficiencies and limitations described hereinabove.

SUMMARY OF THE INVENTION

A first aspect of the present invention is a multi-protocol label switching/virtual private network packet inspection and forwarding network, comprising: a first router, the first router being a provider edge multi-protocol label switching capable router, the first router including a firewall service module for inspection of packets, the firewall service module connected to one or more virtual private networks; one or more second routers, each second router of the one or more second routers being provider edge multi-protocol label switching capable routers, each second router connected to a private virtual network of the one or more virtual private networks; and a network connecting the first router to the one or more second routers.

A second aspect of the present invention is a method of providing multi-protocol label switching/virtual private network packet forwarding, providing a first router, the first router being a provider edge multi-protocol label switching capable router, the first router including a firewall service module, the firewall service module connected to one or more virtual private networks; providing one or more second routers, each second router of the one or more second routers being provider edge multi-protocol label switching capable routers, each second router connected to the one or more virtual private networks; providing a network connecting the first router to the one or more second routers; receiving a private network data packet on the first router; inspecting the private network data packet in the firewall service module against a security policy and rejecting the packet if the packet fails to conform with the security policy; and forwarding the private network data packet over the network to at least one second router of the one or more second routers.

A third aspect of the present invention is a method of providing a service to a customer over a network, the service comprising: providing a network connecting a first router to one or more second routers, the first router and each second router of the one or more second routers being provider edge multi-protocol label switching capable routers; connecting a firewall service module within the first router to one or more multi-protocol labeling switching virtual private networks, each second router of the one or more second routers connected to each multi-protocol labeling switching virtual private network of the one or more multi-protocol labeling switching virtual private networks; receiving a private network packet on the first router from the customer; inspecting the private network data packet in the firewall service module against a security policy and rejecting the packet if the packet fails to conform to the security policy; forwarding the data packet over the network to at least one second router of the one or more second routers; and providing a connection to each second router of the one or more second routers for a respective router of one or more third routers, each third router of the one or more third routers being a client edge router.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Terms and Definitions

Figure 1:
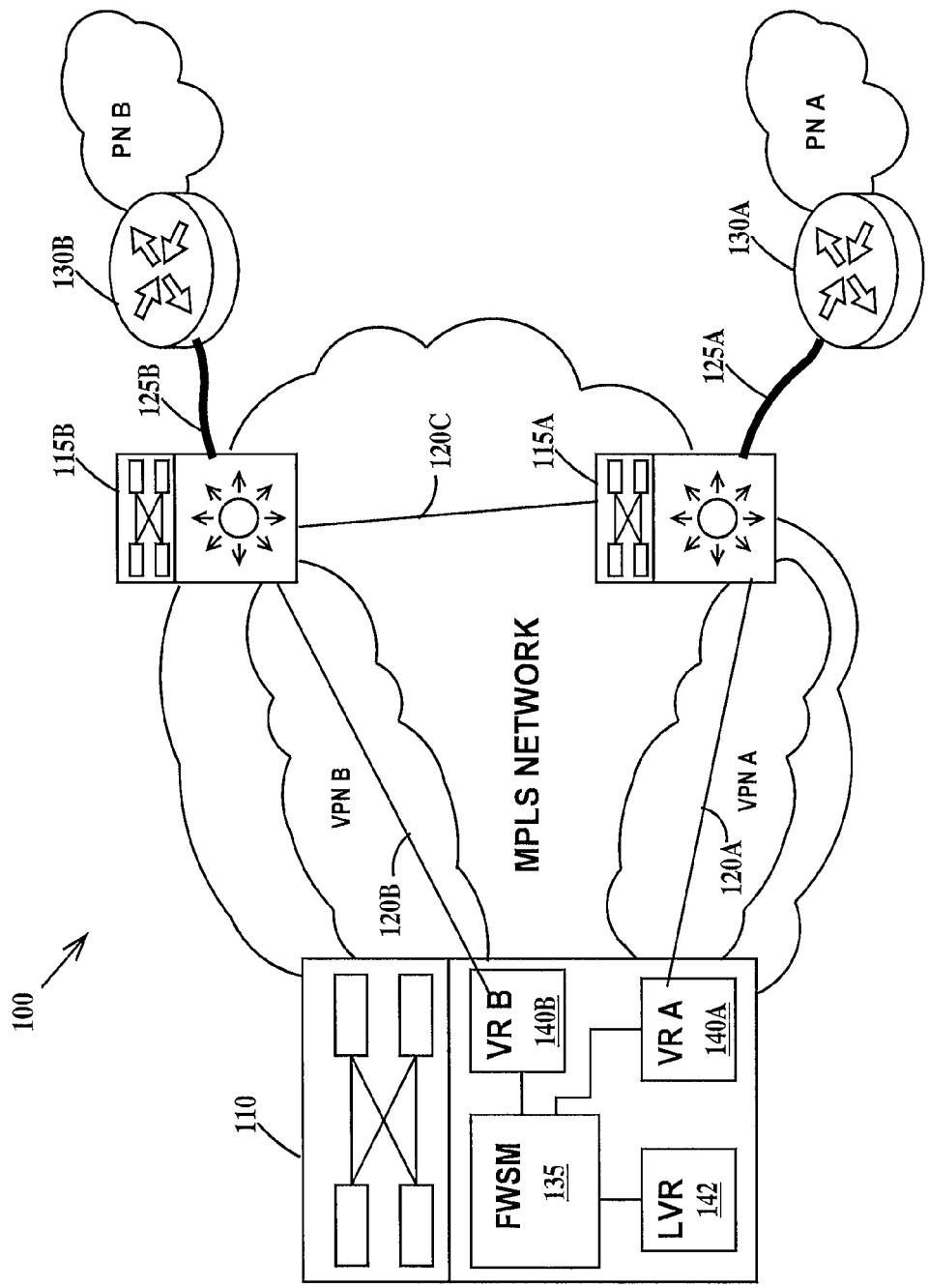
FIG. 1 is a schematic diagram of an MPLS/VPN packet inspection and forwarding network according to a first embodiment of the present invention.

Multicast is the delivery of information to a group of selected destinations simultaneously, delivering messages over each link of the network only once and creating copies when the links to different destinations split. Multicast utilizes multicast destination address.

Multi-protocol label switching (MPLS) is a data carrying mechanism, which emulates some properties of a circuit-switched network over a packet-switched network. MPLS operates in the seven layer Open System Interconnection Reference Model (OSI Reference Model) computer network protocol model layer between the traditional Layer 2 (data link layer) and Layer 3 (network layer). MPLS works by pre-pending data packets with an MPLS header containing one or more labels. These packets are forwarded (i.e. switched) based on the labels.

A virtual private network (VPN) is a private communication network used to transfer information confidentially over a publicly accessible network. Examples of users of private communication networks include, but are not limited to government agencies, corporations, businesses and universities. Examples of public networks include, but are not limited to the Internet, Internet service providers (ISPs) and service provider private networks.

Routing, in computer networking, refers to selecting paths in a computer network along which to send data. Routing directs forwarding, the passing of logically addressed data packets from their source toward their ultimate destination through intermediary nodes (routers). Static routing depends upon pre-constructed routing tables within the routers indicating routes to various network destinations. Dynamic routing constructs routing tables automatically, based on information carried by dynamic routing protocols. Examples of dynamic routing protocols suitable for practicing the embodiments of the present invention include enhanced interior gateway routing protocol (EIGRP), open shortest path first (OSPF), routing information protocol (RIP), intermediate system to intermediate system (IS-IS), and protocol independent multicast (PIM).

A router is a computer networking device that forwards data packets across a network toward their destinations, through a process known as routing. Routing occurs at the Layer 3 (network layer) of the OSI Reference Model. Routers that function as ingress and/or egress routers to a network using MPLS are called provider edge (PE) routers. Routers that connect a private network to a PE router are called client edge (CE) routers. Internal routers providing MPLS connectivity between non-adjacent provider edge routers MPLS are called provider (P) routers. Although general-purpose computers can perform routing, modern high-speed routers are highly specialised computers, generally with extra hardware added to accelerate both common routing functions such as packet forwarding and specialised functions such as encryption.

A virtual router is a software routing process (application) running on an operating system of a physical router or other computer device.

In computing, a firewall is a piece of hardware and/or software that functions in a networked environment to prevent some communications forbidden by the security policy of the network provider or network user. Packet inspection and packet forwarding are inherent firewall functions. A firewall running in transparent mode provides packet forwarding functions that are 'transparent' to the routed network infrastructure, i.e. no IP addresses are assigned the firewall' network interfaces and the firewall does not participate in the advertisement and receipt of dynamic routing information. A firewall running in routed mode is an active component of the network infrastructure; i.e. IP addresses are assigned to the firewall' network interfaces while optionally participating in the advertisement and receipt of dynamic routing information.

A firewall service module (FWSM) is a hardware module that can be inserted into routers to provide firewall functions.

DESCRIPTION OF THE EMBODIMENTS OF THE INVENTION

FIG. 1 is a schematic diagram of an MPLS/VPN packet inspection and forwarding in a network according to a first embodiment of the present invention. In FIG. 1, a network 100 using MPLS, a MPLS capable PE first router 110, an MPLS capable second PE router 115A and an MPLS capable PE third router 115B. The packet inspection and forwarding function is provided by first router 110. First router 110 is connected to second router 115A by a network path 120A. First router 110 is connected to third router 115B by a network path 120B. Second router 115A is connected to third router 115B by a network path 120C. In one example, network paths 120A, 120B and 120C are electrically conductive wires, optical cables, MPLS P routers, wireless connections or combinations thereof. In one example, network 100 is a public network. VPN A traffic between first router 110 and second router 115A and VPN B traffic between first router 110 and second router 115B can take any network path towards the destination node. Network paths 120A, 120B, and 120C can also be used for other, non-VPN traffic.

Connected to second router 115A by a connection 125A is a CE router 130A, which is connected to private network (PN) A. Connected to third router 115B by a connection 125B is a CE router 130B, which is connected to PN B. In one example, connections 125A, 125B and 125C are electrically conductive wires, optical cables, wireless connections or combinations thereof. PN A and PN B comprise the network of computers, printers, servers, and other hardware of the customer.

Included within first router 110, is a FWSM 135. A virtual router 140A is connected between FWSM 135 and MPLS network 100, a virtual router 140B is connected between FWSM 135 and MPLS network 100, and an additional virtual router 142 is connected to FWSM 135. FWSM 135 provides packet inspection and virtual routers 140A, 140B, and 142 provide packet forwarding. In addition, virtual routers 140A, 140B, and 142 may provide dynamic routing control functions, to exchange network route and topology information. The VPN A labeled cloud around network path 120A indicates that both routers 110 and 115 are capable of transmitting and receiving VPN A VPN (not public) data packets. VPN A VPN data packets sent from router 110 through virtual router 140A to second router 115A have been inspected as described supra. The VPN B labeled cloud around network path 120B indicates that VPN (and not public) data packets sent from router 110 through virtual router 140B to third router 115B have been inspected as described supra. Clouds VPN A and VPN B may be considered logical networks within MPLS network 100.

Figure 2:
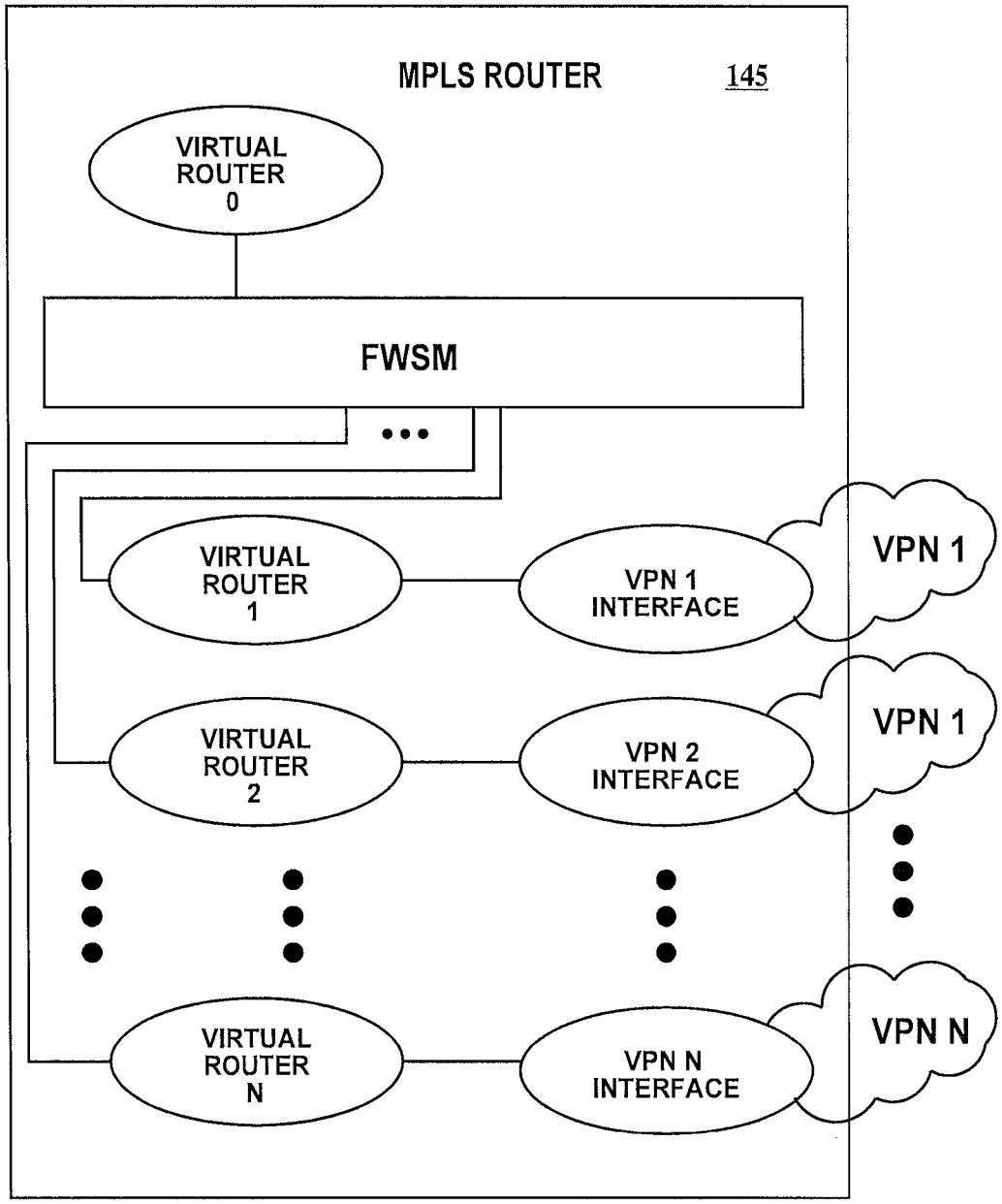
FIG. 2 is a schematic diagram of an MPLS router configured for packet inspection and forwarding in a network according to embodiments of the present invention.

The embodiments of the present invention may be practiced with the router in static or dynamic routing mode and with the FSWM in routed or transparent forwarding mode. FIG. 1, illustrates the components required for the most complex combination, i. e. dynamic routing while using FWSM transparent forwarding. The four possible combinations and their requirements are:

(1) Static routing in FWSM routed forwarding mode requires FWSM 135 and the configuration on FWSM 135 of routed forwarding and static routes to each VPN interface (see FIG. 2).

(2) Dynamic routing in FWSM routed forwarding mode requires FSWM 135, virtual routers 140A and 140B, the configuration of routed forwarding on the FWSM 135, and defining one or more dynamic routing processes on the FWSM and virtual routers.

(3) Static routing in FWSM transparent forwarding mode requires FWSM 135, additional virtual router 142, the configuration of static routes on each VPN interface on the virtual router (see FIG. 2), and the configuration of transparent forwarding on FWSM 135 (see FIG. 2).

(4) Dynamic routing in FWSM transparent forwarding mode requires, FWSM 135, virtual routers 140A and 140B, additional virtual router 142 and the configuration of transparent forwarding on the FWSM.

While only two VPN networks are illustrated in FIG. 1, any number of VPNs can be linked through router 110, each VPN having its own dedicated virtual router (if required as described supra). More than one FWSM may be provided to increase packet inspection capacity, with different sets of VPNs connected to different FWSMs.

It should be understood that MPLS PE routers and MPLS P routers are relative terms in a network environment and a single physical router can be both a MPLS PE router and a MPLS P router. For example, in FIG. 1, if network path 120B is not operational, VPN B traffic between router 110 and router 115B will be sent through network path 120A to router 115A and then along network path 120C to router 115B. Thus router 115A is MPLS P router for VPN B traffic while being a MPLS PE router for VPN A traffic.

FIG. 2 is a schematic diagram of an MPLS router configured for packet inspection and forwarding in a network according to embodiments of the present invention. Again, dynamic routing in FWSM transparent mode is illustrated. In FIG. 2, an MPLS router 145 is exemplary of first router 110 of FIGS. 1 and 3. Router 145 includes a FWSM connected to VPN interfaces 1, 2 . . . N by virtual routers 1, 2 . . . N, respectively. VPN interfaces 1, 2 . . . N are connected to respective logical VPN networks 1, 2 . . . N. Router 145 processor optionally includes an additional virtual router 0 connected to the FWSM.

Figure 3:
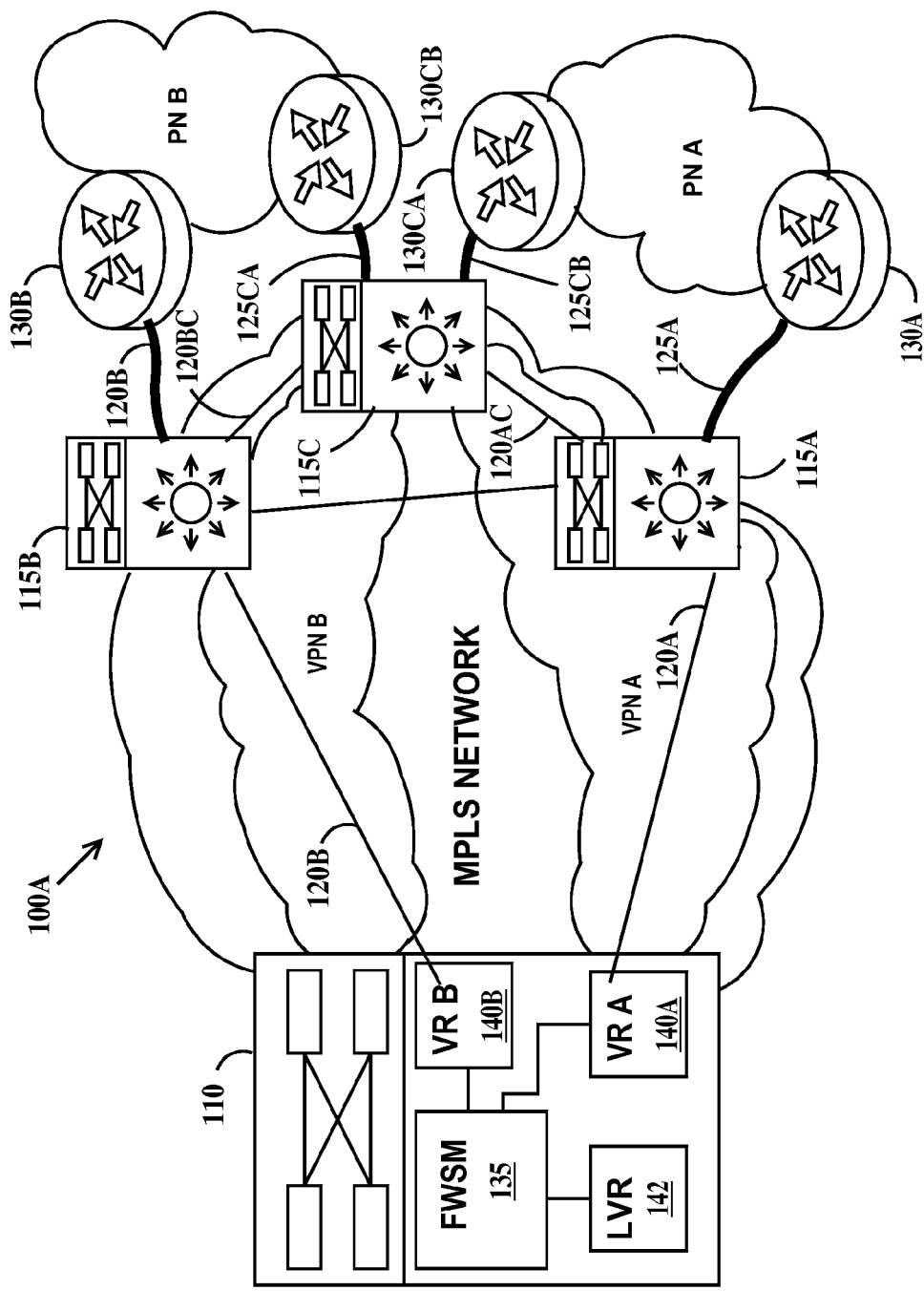
FIG. 3 is a schematic diagram of an MPLS/VPN packet inspection and forwarding in a network according to a second embodiment of the present invention.

FIG. 3 is a schematic diagram of an MPLS/VPN packet inspection and forwarding in a network according to a second embodiment of the present invention. In FIG. 3, an MPLS network 100A includes first router 110, second router 115A, third router 115B and a fourth MPLS capable PE router 115C. The primary difference between network 100A of FIG. 3 and network 100 of FIG. 1 is the addition of fourth router 115C. First router 110 is connected to second router 115A by a network path 120A. First router 110 is connected to third router 115B by a network path 120B. Second router 115A is connected to third router 115B by a network path 120C. Fourth router 115C is connected to second router 115C by network path 120AC and to third router 115B by network path 120BC. Again, any of the network paths 120A, 120B, 120C, 120AC and 120BC can be used to transport data for any of the VPNs. In one example, network paths 120A, 120B, 120C, 120AC and 120BC are electrically conductive wires, optical cables, MPLS P routers, wireless connections or combinations thereof. In one example, network 100A is a public network. Other public traffic may also use network paths 120A, 120B, 120AC and 120BC.

Connected to router 115A by connection 125A is CE router 130A, which is connected to PN A. Connected to router 115B by a connection 125B is CE router 130B, which is connected to PN B. Connected to router 115C by connection 125CA is a CE router 130CA, which is connected to PN A. Connected to router 115C by a connection 125CB is a CE router 130CB, which is connected to PN B. Router 115C provides an alternative network path to PN A and PN B. In one example, connections 125A and 125B, 125C, 125AC and 125BC are electrically conductive wires, optical cables, MPLS P routers, wireless connections or combinations thereof.

Figure 4:
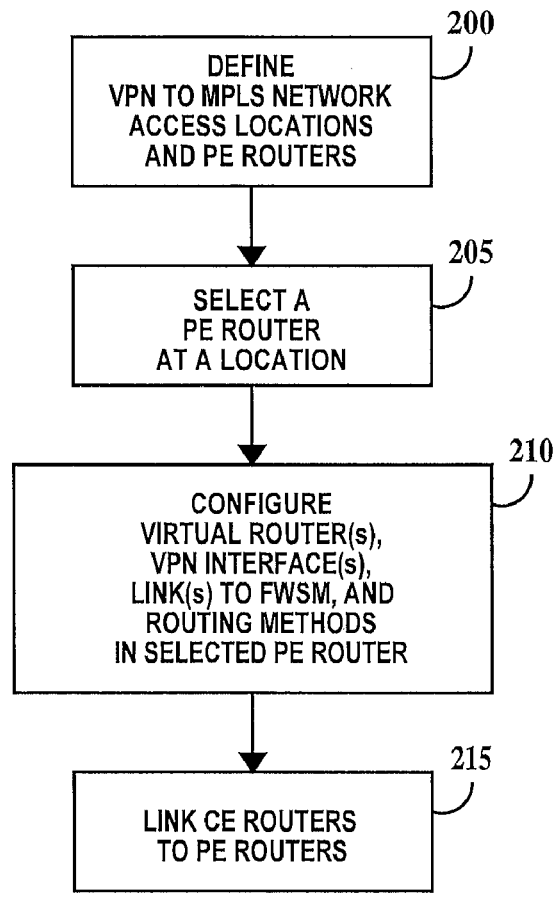
FIG. 4 is a flow diagram illustrating the method steps to set-up a packet inspection and forwarding in a network according to embodiments of the present invention.

FIG. 4 is a flow diagram illustrating the method steps to set-up a packet inspection and forwarding in a network according to embodiments of the present invention. In step 200, the VPN to MPLS network access locations are defined and PE routers at these points selected.

In step 205, the PE router that will provide the inter-VPN packet forwarding is selected.

In step 210, the selected PE router for packet inspection and forwarding is configured for the routing and firewall modes as described infra with virtual router(s), VPN interface(s), links to the FWSM, and FWSM static routes or dynamic routing processes. The connections between the VPN interfaces and virtual routers and between the virtual routers and the FWSM are "software" connections internal to the selected PE router. The FWSM is implemented in a combination of hardware and software. Virtual routers are software process (applications) running on the PE router processor(s).

Configuration is through a user interface on the router. Configuration may be by entering instructions through a keyboard or by use or a mouse with a graphical interface or both. Alternatively, configuration instructions may be coded on a machine-readable media and the instructions loaded into the router.

In step 215, the CE routers linking the VPNs are connected to the network provider PE routers. These connections are electrically conductive wires, optical cables, wireless connections or combinations thereof.

Steps 200, 205, 210, and 215 may be performed by the network provider or steps 200, 205, and 210 may be performed by the service provider and step 215 by the customer (or VPN owner) with the network provider supplying a connection point to the customer. In one example, the network provider and the service provider are the same entity.

Figure 5:
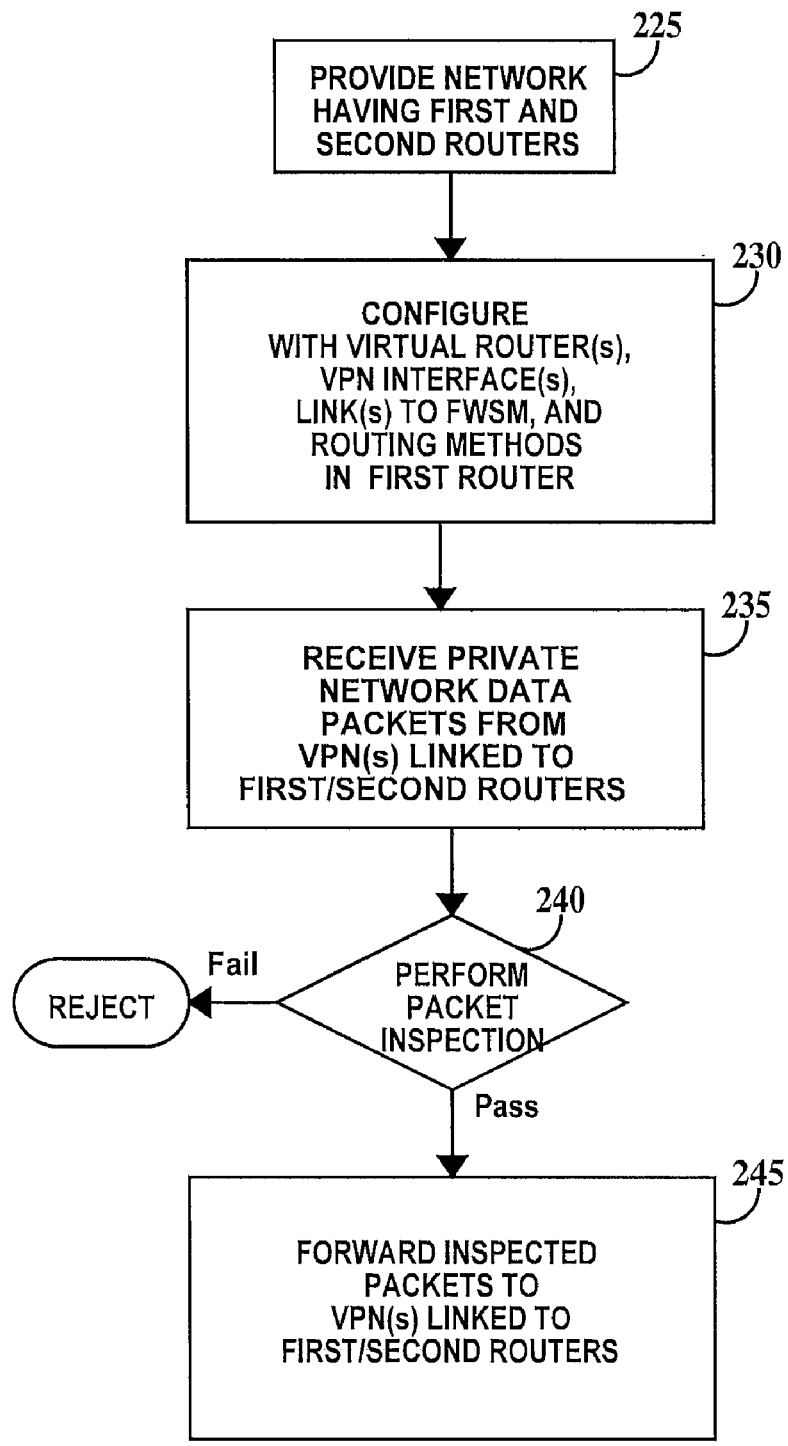
FIG. 5 is a flow diagram of a method of providing a service packet inspection and forwarding using multi-protocol label switching for a virtual private network according to embodiments of the present invention.

FIG. 5 is a flow diagram of a method of providing a service packet inspection and forwarding using multi-protocol label switching for a virtual private network according to embodiments of the present invention. In step 225, a network having a first router connected to one or more second routers is provided. Each of the first and second routers are provider edge multi-protocol label switching capable routers.

In step 230, the first router is configured for the routing and firewall modes as described infra with virtual router(s), VPN interface(s), links to the FWSM, and FWSM static routes or dynamic routing processes.

Next in step 235, for dynamic routing in FWSM transparent forwarding mode, private network data and protocol information as a packet (e.g. from a customer) that is to be inspected and forwarded is received from a VPN through a VPN interface and routed to FWSM by a respective virtual router.

In step 240 the packet is inspected against a security policy of the network provider, or the security policy of the virtual private network or both, and if the packet passes, then in step 245 the packet is forwarded from the FWSM through a virtual router, virtual router interface to a VPN. If the packet does not pass inspection, the packet is refused and other actions, such as sending alerts to a network management station may be taken.

Once the inspected packet is received by one of the PE second routers, it is transmitted to a CE router connected to a virtual private network (e.g. of the customer).

Figure 6:
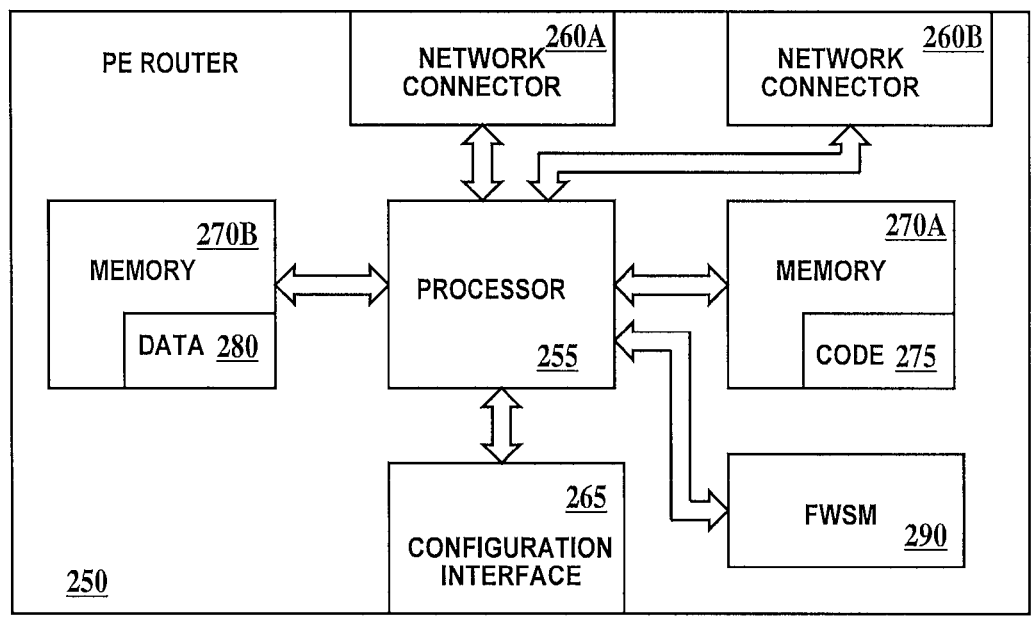
FIG. 6 is a schematic diagram of an exemplary PE router.

FIG. 6 is a schematic diagram of an exemplary hardware router 250 used for packet forwarding using multi-protocol label switching for a virtual private network in accordance with embodiments of the present invention. Router 250 comprises a processor 255 (though only one processor is illustrated in FIG. 6, there may be multiple processors), network connections devices 260A and 260B coupled to processor 255, a configuration input device 265 coupled to processor 255, and memory devices 270A and 270B coupled to processor 255. Configuration input device 265 may be, inter alia, a keyboard, a mouse, etc. The memory devices 270A and 270B may be, inter alia, a hard disk, a floppy disk, a magnetic tape, an optical storage such as a compact disc (CD) or a digital video disc (DVD), a dynamic random access memory (DRAM), a read-only memory (ROM), etc. Memory device 270A includes a computer code 275, which is a computer program that comprises computer-executable instructions. The computer code 250 includes an algorithm for multi-protocol label switching for a virtual private network (e.g., as illustrated in FIG. 2 and described supra or as described in step 210 of FIG. 4). Processor 255 executes computer code 275. Memory device 270B includes input data 280. Input data 280 includes input required by computer code 275. Either or both memory devices 270A and 270B (or one or more additional memory devices not shown in FIG. 5) may be used as a computer usable medium (or a computer readable medium or a program storage device) having a computer readable program embodied therein and/or having other data stored therein, wherein the computer readable program comprises the computer code 275. Generally, a computer program product (or, alternatively, an article of manufacture) of router 250 may comprise said computer usable medium (or said program storage device).

Returning to FIGS. 1 and 3, any of the components of network 100 and 100A of the present invention could be deployed, managed, serviced, etc. by a service provider who offers to supply an inter-MPLS/VPN packet inspection and forwarding service for a customer. Additionally, any of the components of customer VPNs as well as client edge routers connecting the client edge routers to the service providers network could be deployed, managed, serviced, etc. by a service provider who offers to set up an MPLS-VPN network for a client. Thus the present invention discloses a process for deploying or integrating computing infrastructure, comprising integrating computer-readable code into the router 110, wherein the code in combination with router 110 is capable of performing a method for inter-MPLS/VPN packet inspection and forwarding.

In another embodiment, the invention provides a business method that performs the process steps of the invention on a subscription, advertising, and/or fee basis. That is, a service provider, such as a Solution Integrator, could offer to supply an inter-MPLS/VPN packet inspection and forwarding service. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Thus, the embodiments of the present invention provide a method, network and service for inter-MPLS/VPN packet inspection and forwarding.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A multi-protocol label switching/virtual private network racket inspection and forwarding network, comprising:
    a first router, said first router being a provider edge multi-protocol label switching capable router, said first router including a firewall service module configured for inspection of only virtual private network data packets and two or more virtual routers connected to said firewall service module;
    two or more second routers, each second router of said two or more second routers being a provider edge multi-protocol label switching capable router, each second router of said two or more second routers connected to a respective virtual router of said first router through a network path of a multi-protocol label switching network; and
    a third router, said third router being a provider edge multi-protocol label switching capable router, said third router connected to at least two of said two or more second routers by said respective network paths of said multi-protocol label switching network, bypassing said first router.

2. The network of claim 1, said first router further including:
    a respective virtual private network interface connected between each virtual private network of said two or more virtual private networks and said respective virtual routers.

3. The network of claim 1, said first router further including:
    an additional virtual router connected only to said firewall service module.

4. The network of claim 1, wherein said multi-protocol label switching network comprises electrically conductive wires, optical cables, multi-protocol label switching capable provider routers, wireless connections or combinations thereof.

5. The network of claim 1, further including:
    two or more third routers, each third router of said two or more third routers being a client edge router, each third router of said two or more third routers connected between a respective private network and a respective second router of said two or more second routers.

6. The network of claim 5, wherein routers of said third routers are independently connected to routers of said second routers by electrically conductive wires, optical cables, wireless connections or combinations thereof.

7. The network of claim 1, further including:
    two or more fourth routers, each fourth router of said two or more fourth routers being a provider edge multi-protocol label switching capable router, each fourth router of said two or more fourth routers connected to a respective second router of said two or more second routers; and
    two or more fifth routers, each fifth router of said two or more fifth routers being a client edge multi-protocol label switching capable router connected to said third router.

8. The network of claim 7, further including:
    a private network connecting at least one of said fourth routers to one of said fifth routers.

9. The network of claim 7, further including:
    independently connecting routers of said fifth routers to routers of said second routers by electrically conductive wires, optical cables, wireless connections or combinations thereof; and
    independently connecting routers of said fifth routers to said third router by electrically conductive wires, optical cables, wireless connections or combinations thereof.

10. The network of claim 1, wherein said first router and each second router of said two or more second routers are configured to transmit and receive virtual private network packets and not public data packets.

11. A method of providing multi-protocol label switching/virtual private network packet inspection and forwarding, comprising:
    providing a first router, said first router being a provider edge multi-protocol label switching capable router, said first router including a firewall service module configured for inspection of only virtual private network data packets and two or more virtual routers connected to said firewall service module;

providing two or more second routers, each second router of said two or more second routers being a provider edge multi-protocol label switching capable router, each second router of said two or more second routers connected to a respective virtual router of said first router through a network path of a multi-protocol label switching network;

receiving a private network data packet on said first router;

inspecting said private network data packet in said firewall service module against a security policy and rejecting said packet if said packet fails to conform with said security policy;

forwarding said private network data packet over said network to at least one second router of said one or more second routers; and connecting a third router to a respective router of said one or more second routers, said third router being a provider edge router multi-protocol label switching capable router, said third router connected to one or more second routers of said two or more second routers by said respective network paths of said multi-protocol label switching network, bypassing said first router.

12. The method of claim 11, wherein said first router further includes:
a respective virtual private network interface connected between each respective virtual private networks of said two or more virtual private networks and said respective virtual routers; and
said method further including:
configuring, on said firewall service module, static routes to said virtual private network interfaces.

13. The method of claim 11, further including:
defining, on said firewall service module, one or more dynamic routing processes to said virtual routers.

14. The method of claim 11, wherein said first router further includes:
a respective virtual private network interface connected between each respective virtual private networks of said two or more virtual private networks and said respective virtual routers; and
an additional virtual router connected only to said firewall service module; and said method further including:
configuring, on said firewall service module, static routes to said virtual private network interfaces.

15. The method of claim 11, wherein said first router further includes:
an additional virtual router connected to said firewall service module; and said method further including:
defining, on said firewall service module, one or more dynamic routing processes to said additional virtual router.

16. The method of claim 11, further including:
providing two or more third routers, each third router of said two or more third routers being a client edge multi-protocol label switching capable router, each third router of said two or more third routers connected between a respective private network and a respective each second router of said two or more second routers.

17. The method of claim 16, further including:
independently connecting routers of said third routers to routers of said second routers by electrically conductive wires, optical cables, wireless connections or combinations thereof.

18. The method of claim 11, further including:
connecting and bypassing said first router, by said respective network paths of said multi-protocol label switching network, two or more fourth routers to a respective router of said one or more second routers, each fourth router of said two or more fourth routers being a provider edge router; and
connecting two or more fifth routers to said third router, each fifth router of said two or more fifth routers being a client edge router.

19. The method of claim 18, further including:
connecting at least one of said fourth routers to said one of said fifth routers using a private network.

20. The method of claim 18, further including:
independently connecting routers of said fifth routers to routers of said second routers by electrically conductive wires, optical cables, wireless connections or combinations thereof and
independently connecting routers of said fifth routers to said third router by electrically conductive wires, optical cables, wireless connections or combinations thereof.

21. The method of claim 11, further including:
configuring said first router and each second router of said two or more second routers to transmit and receive virtual private network packets and not public data packets.

22. A method of providing a service to a customer over a network, the service comprising:
providing a network connecting a first router to two or more second routers, said first router containing two or more virtual routers connected to a firewall service module configured to inspect only virtual private network data packets, said first router and each second router of said one or more second routers being provider edge multi-protocol label switching capable routers;
connecting each second router of said two or more second routers to respective virtual routers of said first router by network paths of a multi-protocol labeling switching virtual network;
receiving a private network packet on said first router from said customer;
inspecting said private network data packet in said firewall service module against a customer security policy and rejecting said packet if said packet fails to conform to said security policy;
forwarding said data packet over said network to at least one second router of said one or more second routers;
providing a respective connection between each second router of said two or more second routers a corresponding third router of two or more third routers, each third router of said two or more third routers being a client edge router; and
connecting a third router to a respective router of said one or more second routers, said third router being a provider edge router multi-protocol label switching capable router, said third router connected to one or more second routers of said two or more second routers by said respective network paths of said multi-protocol label switching network, bypassing said first router.

23. The method of claim 22, wherein said first router further includes:
a respective virtual private network interface connected between each respective virtual private networks of said two or more virtual private networks and said respective virtual routers; and
said method further including:
configuring, on said firewall service module, static routes to said virtual private network interfaces.

24. The method of claim 22, further including:
defining, on said firewall service module, one or more dynamic routing processes to said virtual routers.

25. The method of claim 22, wherein said first router further includes:
a respective virtual private network interface connected between each respective virtual private networks of said two or more virtual private networks and said respective virtual routers; and
an additional virtual router connected only to said firewall service module; and
said method further including:
defining, on said firewall service module, one or more dynamic routing processes to said virtual routers.

26. The method of claim 22, wherein said first router further includes:
an additional virtual router connected to said firewall service module; and said method further including:
defining, on said firewall service module, one or more dynamic routing processes to said additional virtual router.

27. The method of claim 22, further including:
providing two or more third routers, each third router of said two or more third routers being a client edge multi-protocol label switching capable router, each third router of said two or more third routers connected between a respective private network and a respective each second router of said two or more second routers.

28. The method of claim 22 further including:
connecting and bypassing said first router, by said respective network paths of said multi-protocol label switching network, two or more fourth routers to a respective router of said one or more second routers, each fourth router of said two or more fourth routers being a provider edge router; and
connecting two or more fifth routers to said third router, each fifth router of said two or more fifth routers being a client edge router.

29. The method of claim 28, further including:
connecting at least one of said fourth routers to said one of said fifth routers using a private network.

* * * * *